United States Patent
Abdur-Rashid et al.

(10) Patent No.: US 9,115,249 B2
(45) Date of Patent: Aug. 25, 2015

(54) METHOD FOR THE PRODUCTION OF HYDROGEN FROM THE DEHYDROCOUPLING OF AMINE BORANES

(75) Inventors: Kamaluddin Abdur-Rashid, Mississauga (CA); Todd Graham, York (CA); Chi-Wing Tsang, Toronto (CA); Xuanhua Chen, Oakville (CA); Rongwei Guo, Oakeville (CA); Wenli Jia, Toronto (CA)

(73) Assignee: Kanata Chemical Technologies Inc., Toronto, Ontario (CA)

( * ) Notice: Subject to any disclaimer, the term of this patent is extended or adjusted under 35 U.S.C. 154(b) by 1318 days.

(21) Appl. No.: 12/992,924

(22) PCT Filed: May 15, 2009

(86) PCT No.: PCT/CA2009/000666
§ 371 (c)(1),
(2), (4) Date: Jan. 11, 2011

(87) PCT Pub. No.: WO2009/137932
PCT Pub. Date: Nov. 19, 2009

(65) Prior Publication Data
US 2011/0104046 A1    May 5, 2011

Related U.S. Application Data

(60) Provisional application No. 61/053,802, filed on May 16, 2008.

(51) Int. Cl.
*C01B 3/02*    (2006.01)
*C08G 79/08*   (2006.01)
(Continued)

(52) U.S. Cl.
CPC . *C08G 79/08* (2013.01); *C01B 3/04* (2013.01); *C01B 3/22* (2013.01); *Y02E 60/364* (2013.01)

(58) Field of Classification Search
CPC .......... C01B 3/04; C01B 3/22; Y02E 60/362; Y02E 60/364; B01J 31/1805; B01J 31/181; B01J 31/1815; B01J 31/1875; B01J 31/189; B01J 31/24
USPC ............ 423/648.1, 657, 284; 422/211; 528/7; 252/188.25; 429/416
See application file for complete search history.

(56) References Cited

U.S. PATENT DOCUMENTS 5,198,207 A    3/1993   Knott et al.
7,544,837 B2 *  6/2009   Blacquiere et al. ............... 564/9
(Continued)

FOREIGN PATENT DOCUMENTS

WO    WO2008141439    11/2008

OTHER PUBLICATIONS

Denney, M. C.; Pons, V.; Hebden, T. J.; Heinekey, D. M.; Goldberg, K. I. J. Am. Chem. Soc. 2006, 128:12048-12049.
(Continued)

*Primary Examiner* — Paul Wartalowicz
(74) *Attorney, Agent, or Firm* — Bereskin & Parr LLP/S.E.N.C.R.L., s.r.l.; Michael Fenwick

(57) ABSTRACT

The present disclosure relates to processes and methods of generating hydrogen via the dehydrocoupling of amine boranes using ligand-stabilized homogenous metal catalysts. The amine-borane is shown by the formula (I), $R^1R^2N$—$BHR^3R^4$. A process is also shown for the preparation of a linear, branched or cyclic polymer which comprises a repeating unit of the formula (II), —$[R^1R^2N$—$BR^3R^4]$-n, by reacting $HR^1R^2N$—$BHR^3R^4$ in the presence of at least one ligand-stabilized metal catalyst.

7 Claims, 3 Drawing Sheets

(51) Int. Cl.
*C01B 3/04* (2006.01)
*C01B 3/22* (2006.01)

(56) References Cited

U.S. PATENT DOCUMENTS

| | | | |
|---|---|---|---|
| 7,745,027 B2* | 6/2010 | Mohajeri et al. | 429/416 |
| 2007/0020172 A1* | 1/2007 | Withers-Kirby et al. | 423/648.1 |
| 2007/0025908 A1 | 2/2007 | Sandrock et al. | |
| 2007/0128475 A1 | 6/2007 | Blacquiere | |

OTHER PUBLICATIONS

Jaska, C. A.; Clark, T. J.; Clennenberg, S. B.; Grozea, D.; Turak, A.; Lu, Z.-H.; Manners, I. J. Am. Chem. Soc. 2005, 127:5116-5124.

Jaska, C.A.; Temple, Karen; Lough, Alan J.; and Manners, Ian, J. Am Chem. Soc., 2003, 125:9424-9434.

R. J. Keaton, J. M. Blacquiere, R. T. Baker J. Am. Chem. Soc. 2007, 129:1844-1845.

Ramachadran, P. V.; Gagare, P. D. Inorg. Chem. 2007, 46:7810-7817.

* cited by examiner

METHOD FOR THE PRODUCTION OF HYDROGEN FROM THE DEHYDROCOUPLING OF AMINE BORANES

This application is a national phase entry of PCT/CA2009/000666, filed May 15, 2009, which claims priority from U.S. Provisional patent application Ser. No. 61/053,802 filed May 16, 2008, each of these applications being incorporated herein in their entirety by reference.

FIELD OF THE DISCLOSURE

The present disclosure relates to methods of producing hydrogen, in particular from the metal-catalyzed dehydrocoupling of amine boranes.

BACKGROUND OF THE DISCLOSURE

The world is currently experiencing a severe environmental crisis due to high atmospheric carbon dioxide levels, in addition to an impending energy shortage. Both of these problems are a direct result from excessive fossil fuel utilization. The use of hydrogen ($H_2$) as a fuel offers one highly attractive solution to these problems since the combustion of hydrogen (in a fuel cell, for example) produces only water and hence is free of emissions containing carbon and other pollutants.

Hydrogen gas contains more energy per mass unit than any known combustible fuel (approximately three times as much as gasoline). However, the use of hydrogen as a fuel has some drawbacks, since under ambient conditions it is an extremely low density gas. Hydrogen can be liquefied, cryogenically or with very high pressures (b.p., 1 atm.: −253° C.). These extreme conditions limit the potential widespread and large scale use of hydrogen.

A simple solution to these problems is to store the hydrogen chemically in a material that contains a very high weight percentage of hydrogen in a system that is capable of releasing the hydrogen on demand. Various compounds are known that contain a high gravimetric amount of hydrogen. Many of these compounds (e.g. lithium hydride (LiH, 12.8 wt % hydrogen) or lithium aluminum hydride ($LiAlH_4$, 10.6 wt % hydrogen)) or alane ($AlH_3$, 9 wt % hydrogen, Sandrock, G.; Reilly, J.; Graetz, J.; Wegrzyn, J. "Activated Aluminum Hydride Hydrogen Storage Compositions and Uses Thereof" U.S. Patent Application Publication No. 2007-0025908) suffer from being highly reactive or even potentially explosive and thus it is unlikely that commercial applications utilizing these compounds will be developed. Hydrogen generation by hydrolysis of magnesium hydride ($MgH_2$) is a safer method but usage of metal hydrides will be problematic due to their inherent water sensitivity (U.S. Pat. No. 5,198,207, "Method for the Preparation of Active Magnesium Hydride-Magnesium Hydrogen Storage Systems, Which Reversibly Absorb Hydrogen", Wilfried Knott, Klaus-Dieter Klein, Gotz Koerner, Th. Goldschmidt A G, Oct. 30, 1991) which can easily cause hydrogen formation under unwanted conditions.

The relatively benign compound ammonia borane ($AB=NH_3BH_3$, 19.6 wt % hydrogen) has been indicated by the United States Department of Energy to be number two on the list of potential hydrogen storage materials in terms of hydrogen content; the number one material is methane ($CH_4$), combustion of which will lead to the obvious problem of further carbon dioxide emissions. Clearly, AB has significant advantages over all other known materials in applications where hydrogen is required as an energy carrier.

Goldberg and Heinekey (Denney, M. C.; Pons, V.; Hebden, T. J.; Heinekey, D. M.; Goldberg, K. I. *J. Am. Chem. Soc.* 2006, 128, 12048-12049) describe iridium complexes containing pincer ligands as catalysts in ammonia borane dehydrocoupling. The Baker group indicated that the dehydrocoupling reaction could be effected by a complex containing a base metal (nickel), although the activity of the system was only moderate (R. J. Keaton, J. M. Blacquiere, R. T. *Baker J. Am. Chem. Soc.* 2007, 129, 1844). A heterogenous, rhodium containing dehydrocoupling catalyst was reported by the Manners group where it was shown that the colloidal materials were capable of modest activity for dehydrocoupling (Jaska, C. A.; Clark, T. J.; Clennenberg, S. B.; Grozea, D.; Turak, A.; Lu, Z.-H.; Manners, I. *J. Am. Chem. Soc.* 2005, 127, 5116-5124). The dehydrocoupling of amine-boranes using metal complexes, where the metal is selected from manganese, iron, cobalt, nickel and copper has been reported (Blacquiere, J. M.; Keaton, R. J.; Baker, R. T. U.S. Patent Application Publ. No. US2007/0128475).

SUMMARY OF THE DISCLOSURE

The present disclosure describes a method for extremely rapid hydrogen generation from relatively benign amine boranes (ABs) by metal catalyzed dehydrocoupling. This method produces various polymerized nitrogen and boron-containing compounds, including cycloborazines, borazine and related materials. The method of dehydrocoupling of ABs may be used to generate $H_2$ for portable power sources, such as, but not limited to, fuel cells. The dehydrocoupling of ABs may also be useful for the preparation of inorganic polymers and composite organic/inorganic polymers.

Accordingly the present disclosure includes a method for the production of hydrogen comprising (a) dehydrocoupling at least one amine-borane of the formula (I)

$$R^1R^2HN\text{—}BHR^3R^4 \qquad (I)$$

wherein wherein $R^1$, $R^2$, $R^3$ and $R^4$ are each simultaneously or independently selected from H, fluoro-substituted-$C_{1-20}$alkyl, optionally substituted $C_{1-20}$alkyl and optionally substituted $C_{6-14}$aryl or any two of $R^1$, $R^2$, $R^3$ and $R^4$ are linked to form an optionally substituted $C_{2-10}$alkylene, which together with the nitrogen and/or boron atoms to which they are attached, forms a ring, wherein the optional substituents are independently selected from one or more of $C_{1-6}$alkyl, halo, halo-substituted $C_{1-6}$alkyl, $C_{3-10}$cycloalkyl, aryl and heteroaryl, and in the presence of at least one ligand-stabilized metal catalyst in an inert solvent and, optionally, in the presence of a base, wherein the metal catalyst comprises at least one ligand that bonds to the metal through a nitrogen; and (b) optionally collecting hydrogen produced in the dehydrocoupling of the at least one amine borane.

The present disclosure further includes a method for the dehydrocoupling of at least one amine borane of the formula (I) as defined above comprising contacting the at least one amine borane with at least one ligand-stabilized metal catalyst in an inert solvent and, optionally, in the presence of a base under conditions for the dehydrocoupling of the amine borane to produce hydrogen, wherein the metal catalyst comprises at least one ligand that bonds to the metal through a nitrogen.

Also included within the present disclosure is a hydrogen generation system comprising at least one amine borane of the formula (I) as defined above, at least one ligand-stabilized metal catalyst, an inert solvent and, optionally, a base, wherein the metal catalyst comprises at least one ligand that bonds to the metal through a nitrogen. In an embodiment of the disclosure, the hydrogen generation system comprises a first compartment comprising the at least one amine borane of the formula (I) as defined above, a second compartment comprising the at least one ligand-stabilized metal catalyst, wherein the first or second compartment further comprises an inert solvent and, optionally, a base. The hydrogen generation system further comprises a means for combining the contents of the first compartment with the second compartment so that when the contents are combined, hydrogen is generated. At least one flow controller controls a flow rate of the at least one catalyst or the at least one amine borane.

In a further embodiment of the present disclosure, a proton exchange membrane fuel cell (PEMFC) is used as an electrical generator. The PEMFC comprises an ion-exchange membrane located between an anode and a cathode, said membrane, anode and cathode forming a membrane/electrode assembly (MEA), said MEA being located between a fuel gas diffusion layer and an oxidant gas diffusion layer. An oxidant flow network is in fluid connection with the fuel gas diffusion layer, the oxidant network having an input portion for supplying oxidant, and a fuel flow network fluid in fluid connection with the fuel gas diffusion layer. The fuel network has an input portion for supplying fuel, wherein the fuel flow network is fluidly connected to an amine borane dehydrogenation in-situ hydrogen generator. The generator comprises a first compartment that comprises at least one amine borane, a second compartment comprising at least one ligand-stabilized metal catalyst, wherein the first or said second compartment comprises an inert solvent and, optionally, a base. A means for combining the contents of the first compartment with the second compartment so that when the contents are combined, hydrogen is generated is included. At least one flow controller controls a flow rate of the at least one catalyst or the at lease one amine borane.

In another embodiment of the disclosure, there is also included a linear, branched or cyclic polymer comprising a repeating unit of the formula (II):

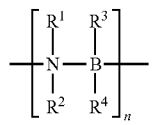

wherein $R^1$, $R^2$, $R^3$ and $R^4$ are each simultaneously or independently selected from H, fluoro-substituted-$C_{1-20}$alkyl, optionally substituted $C_{1-20}$alkyl and optionally substituted $C_{6-14}$aryl or any two of $R^1$, $R^2$, $R^3$ and $R^4$ are linked to form an optionally substituted $C_{2-10}$alkylene, which together with the nitrogen and/or boron atoms to which they are attached, forms a ring,
wherein the optional substituents are independently selected from one or more of $C_{1-6}$alkyl, halo, halo-substituted $C_{1-6}$alkyl, $C_{3-10}$cycloalkyl, aryl and heteroaryl, and n is an integer ≥2.

In another embodiment, $R^1$, $R^2$, $R^3$ and $R^4$ are each simultaneously or independently selected from H, fluoro-substituted-$C_{1-8}$alkyl, optionally substituted $C_{1-8}$alkyl and optionally substituted $C_6$-aryl. In a further embodiment, $R^1$, $R^2$, $R^3$ and $R^4$ are each simultaneously or independently selected from H, fluoro-substituted-$C_{1-4}$alkyl, optionally substituted $C_{1-4}$alkyl and optionally substituted phenyl. In an embodiment, $R^1$, $R^2$, $R^3$ and $R^4$ are each simultaneously or independently selected from H, methyl, ethyl and propyl. In a further embodiment, $R^1$, $R^2$, $R^3$ and $R^4$ are each simultaneously or independently selected from H and methyl. In another embodiment, $R^1$, $R^3$ and $R^4$ are H and $R^2$ is methyl.

In another embodiment, n is an integer greater than 2 and less than about 4,000,000. In a further embodiment, n is an integer greater than 2 and less than about 3,500,000. In a further embodiment, n is an integer greater than 2 and less than about 2,000,000. In a further embodiment, n is an integer greater than 2 and less than about 1,000,000. In a further embodiment, n is an integer greater than 2 and less than about 500,000. In a further embodiment, n is an integer greater than 2 and less than about 100,000.

In a further embodiment of the present disclosure, there is also provided a process for the preparation of a linear, branched or cyclic polymer comprising a repeating unit of the formula (II), the process comprising,

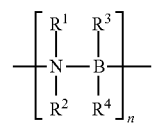

reacting a compound of the formula (I),

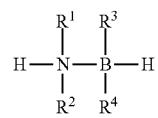

wherein $R^1$, $R^2$, $R^3$ and $R^4$ are each simultaneously or independently selected from H, fluoro-substituted-$C_{1-20}$alkyl, optionally substituted $C_{1-20}$alkyl and optionally substituted $C_{6-14}$aryl or any two of $R^1$, $R^2$, $R^3$ and $R^4$ are linked to form an optionally substituted $C_{2-10}$alkylene, which together with the nitrogen and/or boron atoms to which they are attached, forms a ring,
wherein the optional substituents are independently selected from one or more of $C_{1-6}$alkyl, halo, halo-substituted $C_{1-6}$alkyl, $C_{3-10}$cycloalkyl, aryl and heteroaryl, and n is an integer ≥2,
in the presence of at least one ligand-stabilized metal catalyst in an inert solvent and, optionally, in the presence of a base, wherein the metal catalyst comprises at least one ligand that bonds to the metal through a nitrogen.

In another embodiment, n is an integer greater than 2 and less than about 4,000,000. In a further embodiment, n is an integer greater than 2 and less than about 3,500,000. In a further embodiment, n is an integer greater than 2 and less than about 2,000,000. In a further embodiment, n is an integer greater than 2 and less than about 1,000,000. In a further embodiment, n is an integer greater than 2 and less than about 500,000. In a further embodiment, n is an integer greater than 2 and less than about 100,000.

Other features and advantages of the present disclosure will become apparent from the following detailed description. It should be understood, however, that the detailed description and the specific examples while indicating preferred embodiments of the disclosure are given by way of illustration only, since various changes and modifications within the spirit and scope of the disclosure will become apparent to those skilled in the art from this detailed description.

BRIEF DESCRIPTION OF THE DRAWINGS

The present disclosure will now be described in greater detail with reference to the following drawings in which.

DETAILED DESCRIPTION OF THE DISCLOSURE

Definitions

Figure 1:
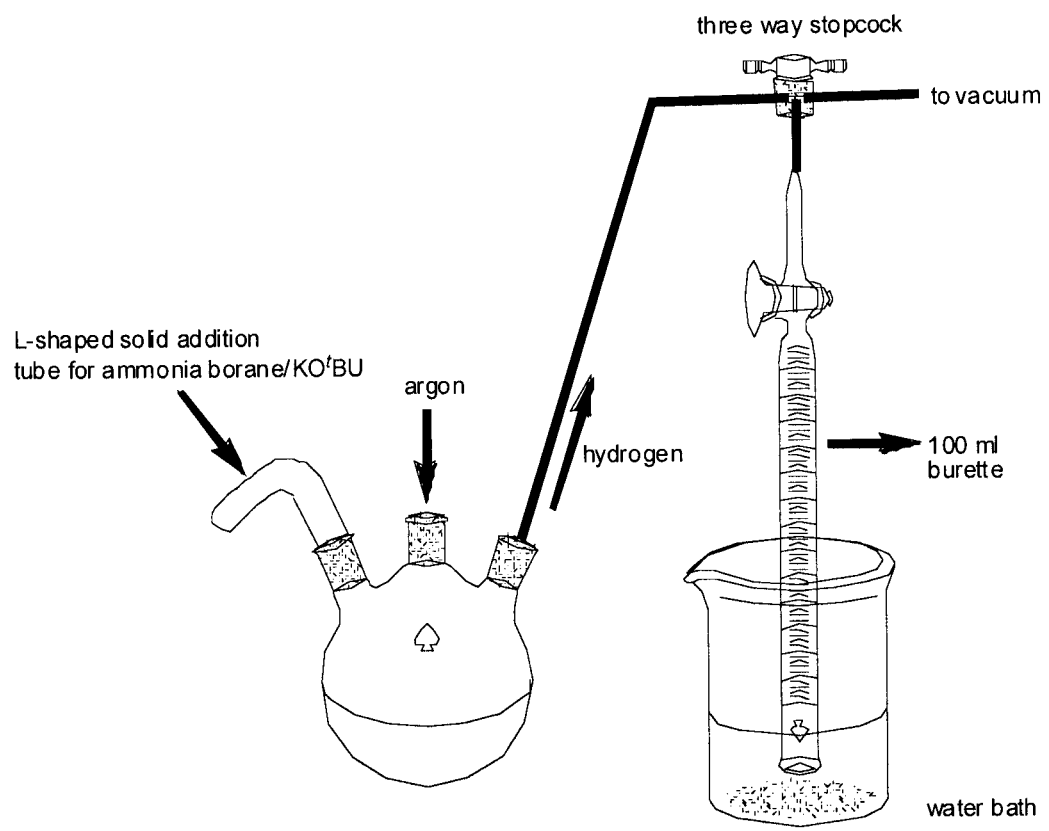
FIG. 1 is a schematic showing the equipment used for the metal catalyzed dehydrocoupling of AB when less than 100 ml of hydrogen was generated.

The term "$C_{1-p}$alkyl" as used herein means straight or branched chain, saturated alkyl groups containing from one to n carbon atoms and includes (depending on the identity of p) methyl, ethyl, propyl, isopropyl, n-butyl, s-butyl, isobutyl, t-butyl, 2,2-dimethylbutyl, n-pentyl, 2-methylpentyl, 3-methylpentyl, 4-methylpentyl, n-hexyl and the like, where the variable p is an integer representing the largest number of carbon atoms in the alkyl group.

The term "$C_{1-p}$alkenyl" as used herein means straight or branched chain, unsaturated alkyl groups containing from one to n carbon atoms and one to three double bonds, and includes (depending on the identity of p) vinyl, allyl, 2-methylprop-1-enyl, but-1-enyl, but-2-enyl, but-3-enyl, 2-methylbut-1-enyl, 2-methylpent-1-enyl, 4-methylpent-1-enyl, 4-methylpent-2-enyl, 2-methylpent-2-enyl, 4-methylpenta-1,3-dienyl, hexen-1-yl and the like, where the variable p is an integer representing the largest number of carbon atoms in the alkenyl group.

The term "$C_{6-p}$aryl" as used herein means a monocyclic, bicyclic or tricyclic carbocyclic ring system containing from 6 to p carbon atoms and includes, depending on the identity of p, phenyl, naphthyl, anthracenyl, 1,2-dihydronaphthyl, 1,2,3,4-tetrahydronaphthyl, fluorenyl, indanyl, indenyl and the like, where the variable p is an integer representing the largest number of carbon atoms in the aryl group.

The term "heteroaryl as used herein means a monocyclic, bicyclic or tricyclic ring system containing from 5 to 14 atoms of which one or more, for example 1-8, suitably, 1-6, more suitably 1-5, and more suitably 1-4, of the atoms are a heteromoiety selected from O, S, NH and NC$_{1-6}$alkyl, with the remaining atoms being C or CH, said ring system containing at least one aromatic ring. Examples of heteroaryl groups, include, but are not limited to thienyl, imidazolyl, pyridyl, oxazolyl, indolyl, furanyl, benzothienyl, benzofuranyl and the like.

The suffix "ene" added on to any of the above groups means that the group is divalent, i.e. inserted between two other groups. When the group is a ring system, the two other groups may be located at any location on the ring system, including at adjacent and non-adjacent nodes. For example, if the group is phenylene, the two other groups may be located at positions 1 and 2, 1 and 3 or 1 and 4.

The term "substituted" as used herein, unless otherwise specified, means that the group is substituted with one or more, optionally one to six, suitably one to three, groups independently selected from OH, SH, NH$_2$, NHC$_{1-6}$alkyl, N(C$_{1-6}$alkyl)(C$_{1-6}$alkyl), C$_{1-6}$alkyl, C$_{1-6}$alkoxy, C$_{1-6}$thioalkoxy, halo, fluoro-substituted C$_{1-6}$alkyl, fluoro-substituted C$_{1-6}$alkoxy, fluoro-substituted C$_{1-6}$thioalkoxy, fluoro-substituted NHC$_{1-6}$alkyl and fluoro-substituted N(C$_{1-6}$alkyl)(C$_{1-6}$alkyl). In an embodiment of the disclosure, the substituents are selected from one or more, optionally one to six, suitably one to three, groups independently selected from OH, SH, NH$_2$, NHCH$_3$, N(CH$_3$)$_2$, CH$_3$, OCH$_3$, SCH$_3$, halo, CF$_3$, OCF$_3$, SCF$_3$, NHCF$_3$ and fluoro-substituted N(CF$_3$)$_2$.

The term "halo" as used herein means halogen and includes chlorine, bromine, iodine and fluorine.

The term "fluoro-substituted" as used herein means that one or more, including all, of the hydrogens in the group have been replaced with fluorine.

The term "ring system" as used herein refers to a carbon-containing ring system, that includes monocycles, fused bicyclic and polycyclic rings, bridged rings and metalocenes. Where specified, the carbons in the rings may be substituted or replaced with heteroatoms.

The term "coordinating" as used herein refers to a chemical grouping which formally bonds to or shares electrons with the metal center in a covalent bond.

The term "non-coordinating" as used herein refers to a chemical grouping which does not formally bond to or share electrons with the metal center in a covalent bond.

By "ligand stabilized" it is meant that the ligand stabilizes the metal to allow easier handling of an otherwise reactive center. The coordinating atoms of such ligands include, but is not limited to phosphorus, nitrogen, oxygen, carbon, silicon, germanium, sulfur, selenium and arsenic. Such ligands include compounds having one or more type of coordinating atoms, in various combinations, including but not limited to phosphines, arsines, diphosphines, imines, pyridines, amines, carbenes, aminophosphines, diamines, aminodiphosphines, diaminodiphosphines, dicarbenes, aminocarbenes, phosphinocarbenes, alcohols, ethers, aminoethers, phosphinoethers, aminoalcohols, aminothiols, etc.

The term "homogeneous" as used herein means that the ligand stabilized catalyst is essentially soluble in the reaction solvent(s) and remains essentially in solution throughout the reaction process with minimal amounts of precipitation of the catalyst.

The term "inert solvent" as used herein means a solvent that does not react with or interfere with the activity of the amine borane of the formula (I) and the ligand-stabilized metal catalyst. In an embodiment of the disclosure, the inert solvent is anhydrous and is degassed prior to use. In a further embodiment of the disclosure, the inert solvent is a polar, aprotic solvent. Non-limiting examples of inert solvents include tetrahydrofuran (THF), toluene, methylene chloride, 1,2-dichlorobenzene, 1,2-dimethoxyethane, diglyme, polyethylene glycol dimethyl ether and mixtures thereof.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

Methods of the Disclosure

Catalytic dehydrocoupling of ammonia borane occurs via hydrogen elimination with concomitant polymerization (Scheme 1) of the nitrogen and boron containing compounds to form various molecules, including polyaminoboranes, cycloborazanes, borazine and related materials.

Scheme 1

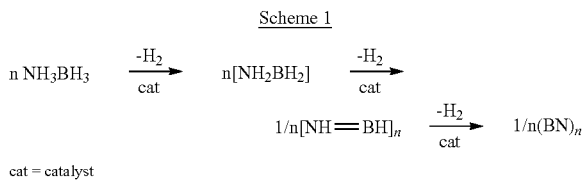

cat = catalyst

The present disclosure includes a method for the production of hydrogen comprising
(a) dehydrocoupling at least one amine-borane of the formula (I)

$$R^1R^2HN\text{---}BHR^3R^4 \qquad (I)$$

wherein $R^1$, $R^2$, $R^3$ and $R^4$ are each simultaneously or independently selected from H, fluoro-substituted-$C_{1-20}$alkyl, optionally substituted $C_{1-20}$alkyl and optionally substituted $C_{6-14}$aryl or any two of $R^1$, $R^2$, $R^3$ and $R^4$ are linked to form an optionally substituted $C_{2-10}$alkylene, which together with the nitrogen and/or boron atoms to which they are attached, forms a ring,
wherein the optional substituents are independently selected from one or more of $C_{1-6}$alkyl, halo, halo-substituted $C_{1-6}$alkyl, $C_{3-10}$cycloalkyl, aryl and heteroaryl.
in the presence of at least one ligand-stabilized metal catalyst in an inert solvent and, optionally, in the presence of a base, wherein the metal catalyst comprises at least one ligand that bonds to the metal through a nitrogen; and
(b) optionally collecting hydrogen produced in the dehydrocoupling of the at least one amine borane.

In an embodiment of the disclosure, $R^1$, $R^2$, $R^3$ and $R^4$ are different. In a further embodiment, $R^1$, $R^2$, $R^3$ and $R^4$ are each simultaneously or independently selected from H, fluoro-substituted-$C_{1-10}$alkyl, optionally substituted $C_{1-10}$alkyl and optionally substituted $C_{6-10}$aryl or any two of $R^1$, $R^2$, $R^3$ and $R^4$ are linked to form an optionally substituted $C_{2-6}$alkylene, which together with the nitrogen and/or boron atoms, forms a ring. In another embodiment, $R^1$, $R^2$, $R^3$ and $R^4$ are each simultaneously or independently selected from H, fluoro-substituted-$C_{1-6}$alkyl, optionally substituted $C_{1-6}$alkyl and optionally substituted phenyl, or $R^1$ and $R^2$ and/or $R^3$ and $R^4$ are linked to form a optionally substituted $C_{2-6}$alkylene, which together with the nitrogen atom and/or boron atom, forms a ring. In a further embodiment of the disclosure, $R^1$, $R^2$, $R^3$ and $R^4$ are each H. In another embodiment, $R^1$, $R^3$ and $R^4$ are H and $R^2$ is methyl.

In another embodiment, the optional substituents are independently selected from one or more of $C_{1-4}$alkyl, halo, halo-substituted $C_{1-4}$alkyl, $C_{5-8}$cycloalkyl and $C_6$aryl. In another embodiment, the optional substituents are $C_{1-3}$alkyl, halo, halo-substituted $C_{1-3}$alkyl, $C_{5-6}$cycloalkyl and phenyl.

The reaction conditions for the dehydrocoupling of the amine boranes of the formula (I) according to the methods of the present disclosure can vary depending on a number of factors including, for example, the identity of the catalyst and the scale of the reaction, as would be known to a person skilled in the art. In embodiments of the present disclosure, the conditions include dissolving the at least one ligand-stabilized metal catalyst in the inert solvent and adjusting the temperature of this solution so that it is in the range of about 20° C. to about 60° C., suitably about 40° C. The at least one amine borane of the formula (I) and the base, if used, are then added to the catalyst solution and hydrogen is generated. The hydrogen that is generated in this reaction may optionally be captured using any known means. The reaction produces, in addition to hydrogen gas various polymerized products, including, for example, polyaminoboranes, cycloborazanes, borazine and related materials. In an embodiment of the disclosure, the dehydrocoupling reaction is performed in an inert atmosphere, for example, under argon.

The base, if used in the method of the disclosure, may be any suitable base, including alkali alkoxides, alkali hydroxides, organic amines and the like and mixtures thereof. In an embodiment of the disclosure, the base is an alkali alkoxide such as potassium t-butoxide (KOtBu). It is an embodiment of the present disclosure that a base is used.

In the present disclosure, it has been shown that a wide variety of nitrogen containing ligands and metals may be used to catalyze the dehydrocoupling of amine boranes. In an embodiment of the disclosure, the metal includes all known metals, including, the alkali metals lithium (Li), sodium (Na), potassium (K), rubidium (Rb), cesium (Cs) and francium (Fr); the alkaline earth metals beryllium (Be), magnesium (Mg), calcium (Ca), strontium (Sr), barium (Ba) and radium (Ra); the p-block metals aluminum (Al), gallium (Ga), indium (In), tin (Sn), thallium (Tl), lead (Pb), and bismuth (Bi); the d-block or transition metals scandium (Sc), titanium (Ti), vanadium (V), chromium (Cr), manganese (Mn), iron (Fe), cobalt (Co), nickel (Ni), copper (Cu), zinc (Zn), yttrium (Y) zirconium (Zr), niobium (Nb), molybdenum (Mo), technetium (Tc), ruthenium (Ru), palladium (Pd), silver (Ag), cadium (Cd), hafnium (Hf), tantalum (Ta), tungsten (W), rhenium (Re), osmium (Os), iridium (Ir), platinum (Pt), gold (Au) and mercury (Hg); the lanthanides lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium; and the actinides actinium (Ac), thorium (Th), protactinium (Pa), uranium (U), neptunium (Np), plutonium (Pu), americium (Am). Curium, Cm, Berkelium, (Bk), californium (Cf), einsteinium (Es), fermium (Fm), mendelevium (Md), nobelium (No) and lawrencium (Lr). In embodiments of the disclosure, the metal is a transition metal. In other embodiments of the disclosure, the metal is selected from Ru, Co, Ni, Rh, Re and Ir.

With respect to the identity of the ligands, the metal catalyst comprises at least one ligand that bonds to the metal via a nitrogen atom. The nitrogen must have a pair of electrons available for binding but may be saturated (primary, secondary or tertiary amine) or unsaturated (imine or aromatic amine). There are many such ligands known in the art. In an embodiment of the disclosure, the nitrogen-coordinating ligand is selected from one or more of an N2, PN, PNP, PNNP, NPN, NS or NNN ligand wherein
N2 is a bidentate ligand of the formula $R^5R^6N\text{-}Q^1\text{-}NR^7R^8$;
PN is a bindante ligand of the formula $R^9R^{10}P\text{-}Q^2\text{-}NR^{11}R^{12}$;
PNP is a tridentate ligand of the formula $R^{13}R^{14}P\text{-}Q^3\text{-}NR^{15}\text{-}Q^4\text{-}PR^{16}R^{17}$;
PNNP is a tetradentate ligand of the formula $R^{18}R^{19}P\text{-}Q^5\text{-}NR^{20}\text{-}Q^6\text{-}NR^{21}\text{-}Q^7\text{-}PR^{22}R^{23}$;
NPN is a tridentate ligand of the formula $R^{24}R^{25}N\text{-}Q^8\text{-}PR^{26}\text{-}Q^9\text{-}NR^{27}R^{28}$;
NS is a bidentate ligand of the formula $R^{29}R^{30}N\text{-}Q^{10}\text{-}SR^{31}$;
and NNN is a tridentate ligand of the formula $R^{32}R^{33}N-Q^{11}-NR^{34}-Q^{12}-NR^{35}R^{36}$, wherein $R^5-R^{36}$ are independently selected from unsubstituted or substituted $C_{1-10}$alkyl, unsubstituted or substituted $C_{2-10}$alkenyl, unsubstituted or substituted $C_{3-10}$cycloalkyl, unsubstituted or substituted $C_{6-14}$aryl, or any two adjacent or geminal $R^5-R^{36}$ groups are bonded together to form, together with the atoms to which they are attached, a 5-14-membered monocyclic, polycyclic, heterocyclic, carbocyclic, saturated or unsaturated ring system and any of $R^5-R^{36}$, including rings formed therewith are achiral or chiral; and $Q^1-Q^{12}$ are independently selected from unsubstituted or substituted $C_1-C_{10}$alkylene and unsubstituted or substituted $C_1-C_{10}$alkenylene where adjacent or geminal substituents on $Q^1-Q^{12}$ are joined together to form, including the atoms to which they are attached, one or more unsubstituted or substituted 5-14-membered monocyclic, polycyclic, heterocyclic, carbocyclic, saturated, unsaturated or metallocenyl ring systems, and/or one or more of the carbon atoms in $Q^1-Q^{12}$ is optionally replaced with a heteromoiety selected from O, S, NH and N($C_{1-6}$alkyl) and any of $Q^1-Q^{12}$ is chiral or achiral, and wherein the optional substituents are independently selected from one or more of $C_{1-6}$alkyl, halo, halo-substituted $C_{1-6}$alkyl, $C_{3-10}$cycloalkyl, aryl and heteroaryl.

The metal catalysts may also comprise one or more of non-coordinating or coordinating, neutral or anionic and/or Lewis basic ligands, depending on the valency and size characteristics of the metal as would be known to those skilled in the art. Examples of such ligands include, but are not limited to phosphines $PR^{37}R^{38}R^{39}$ and bisphospines $R^{40}R^{41}P-Q^{13}-PR^{42}R^{43}$ wherein $R^{37}-R^{43}$ are as defined above for $R^5-R^{36}$ and $Q^{13}$ is as defined above for $Q^1-Q^{12}$, cyclooctadecane, halo (in particular Cl), OH, H, CO, pyridine, benzene and benzene derivatives and acetonitrile. The catalyst may also be monocationic or dicationic.

In an embodiment of the disclosure the nitrogen coordinating ligand is selected from one or more of:

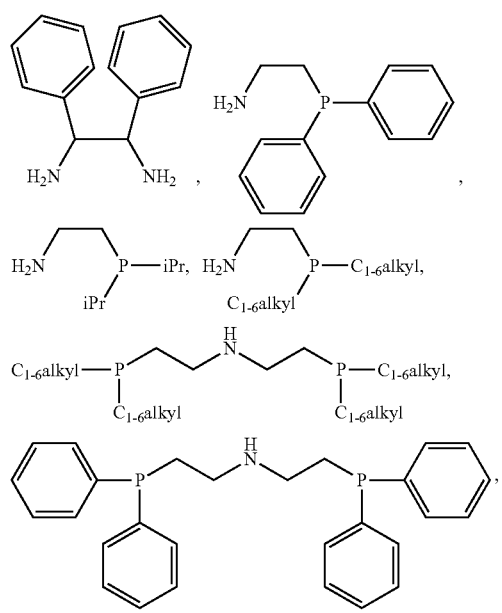

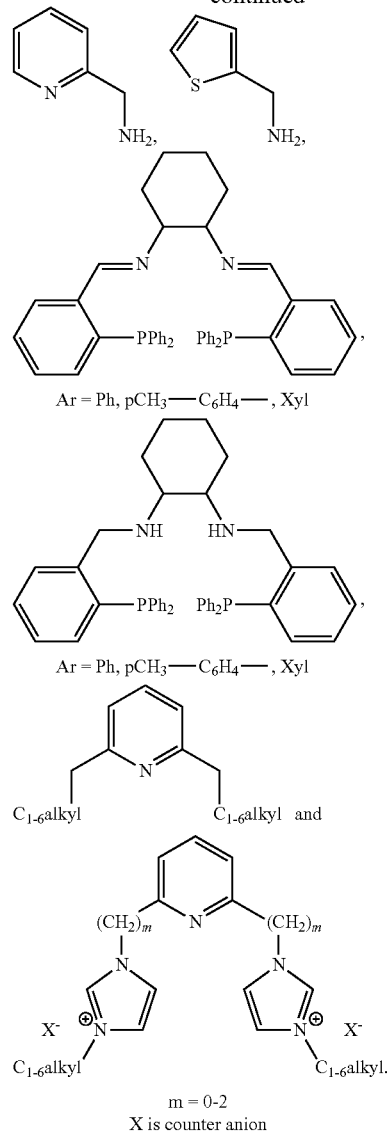

m = 0-2
X is counter anion

It is to be understood that the above-described ligands are representative examples.

The catalysts may be prepared and isolated prior to use in the processes of the disclosure or they may be generated in situ.

The present disclosure further includes a method for the dehydrocoupling of at least one amine borane of the formula (I) as defined above comprising contacting the at least one amine borane with at least one ligand-stabilized metal catalyst in an inert solvent and, optionally, in the presence of a base under conditions for the dehydrocoupling of the amine borane to produce hydrogen, wherein the metal catalyst comprises at least one ligand that bonds to the metal through a nitrogen.

Hydrogen Generation Systems

There are expected to be many applications for the methods of the present disclosure. In one embodiment, the methods of the disclosure are used to generate hydrogen, which is supplied to a hydrogen fuel cell, such as a PEMFC. Hydrogen generators may include a first compartment holding a catalyst-comprising solution and a second compartment holding the one or more amine boranes of the formula I as defined above, wherein the metal catalyst comprises at least one ligand that bonds to the metal through a nitrogen. Control electronics are coupled to catalyst mass flow controllers and hydrogen mass flow controllers. Catalyst mass flow controllers control the flow of the catalyst solution, which enters second compartment to achieve a desired hydrogen flow generated by the hydrogen generator. A coupling connector delivers hydrogen generated by hydrogen generator to the anode of a PEMFC.

In the embodiment of the disclosure, the one or more amine boranes of formula I are stored in a second compartment as a solid or as a solution in the inert solvent. In operation, as soon as the hydrogen generator is turned on, control electronics send a signal to a mass flow controller (or a flow controller) to allow a predetermined flow rate of the one or more metal catalysts in an inert solvent in a first compartment to flow into the second compartment which holds the one or more amine boranes. As a result, hydrogen gas in generated. The reaction by-products are captured and remain in the second compartment. In alternate embodiments the one or more amine boranes can be provided in the first compartment and be pumped into the second compartment holding the one or more metal catalysts. If a base is used, it may be added with the one or more metal catalysts or one or more amine boranes, suitably with the one or more amine boranes.

Hydrogen generators disclosed herein are capable of delivering PEMFC grade hydrogen gas by virtue of the low reaction temperature available, safely and reliably in an integrated and self-sustaining device that offers high specific energy storage density. Hydrogen PEM fuel cells are optimal for applications in the power range of 5-500 W where batteries and internal combustion engines do not deliver cost-effective and convenient power generation solutions. Unlike secondary batteries, the hydrogen generators disclosed here and formulations therein provide a constant source of power in a compact size that does not require electrical recharging.

The systems disclosed herein can thus provide a viable solution to many military and civilian applications in need of a lightweight, highly dependable power source. Examples include, among others, auxiliary power units for small and remote applications, shelter power, emergency power, external power pack, battery charger, portable power for soldiers, unmanned aerial vehicles, and robotics.

Accordingly, also included within the present disclosure is a hydrogen generation system comprising at least one amine borane of the formula (I) as defined above, at least one ligand-stabilized metal catalyst, an inert solvent and, optionally, a base, wherein the metal catalyst comprises at least one ligand that bonds to the metal through a nitrogen. In an embodiment of the disclosure, the hydrogen generation system comprises a first compartment comprising the at least one amine borane of the formula (I) as defined above, a second compartment comprising the at least one ligand-stabilized metal catalyst, wherein the first or second compartment further comprises an inert solvent and, optionally, a base. The hydrogen generation system further comprises a means for combining the contents of the first compartment with the second compartment so that when the contents are combined, hydrogen is generated. At least one flow controller controls a flow rate of the at least one catalyst or the at least one amine borane.

In a further embodiment of the present disclosure, a proton exchange membrane fuel cell (PEMFC) is used as an electrical generator. The PEMFC comprises an ion-exchange membrane located between an anode and a cathode, said membrane, anode and cathode forming a membrane/electrode assembly (MEA), said MEA being located between a fuel gas diffusion layer and an oxidant gas diffusion layer. An oxidant flow network is in fluid connection with the fuel gas diffusion layer, the oxidant network having an input portion for supplying oxidant, and a fuel flow network fluid in fluid connection with the fuel gas diffusion layer. The fuel network has an input portion for supplying fuel, wherein the fuel flow network is fluidly connected to an amine borane dehydrogenation in-situ hydrogen generator. The generator comprises a first compartment that comprises at least one amine borane, a second compartment comprising at least one ligand-stabilized metal catalyst, wherein the first or said second compartment comprises an inert solvent and, optionally, a base and wherein the metal catalysts comprises at least one ligand that bonds to the metal through a nitrogen. A means for combining the contents of the first compartment with the second compartment so that when the contents are combined, hydrogen is generated is included. At least one flow controller controls a flow rate of the at least one catalyst or the at lease one amine borane.

Polymers of the Disclosure

The catalytic decoupling of amine boranes in the present disclosure results in the production of hydrogen, and also polymeric materials from the dehydrocoupling of the amine boranes. Accordingly, also included in the present disclosure are linear, branched or cyclic polymers comprising a repeating unit of the formula (II)

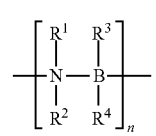

(II)

wherein $R^1$, $R^2$, $R^3$ and $R^4$ are each simultaneously or independently selected from H, fluoro-substituted-$C_{1-20}$alkyl, optionally substituted $C_{1-20}$alkyl and optionally substituted $C_{6-14}$aryl or any two of $R^1$, $R^2$, $R^3$ and $R^4$ are linked to form an optionally substituted $C_{2-10}$alkylene, which together with the nitrogen and/or boron atoms to which they are attached, forms a ring, wherein the optional substituents are independently selected from one or more of $C_{1-6}$alkyl, halo, halo-substituted $C_{1-6}$alkyl, $C_{3-10}$cycloalkyl, aryl and heteroaryl, and n is an integer ≥2.

In a further embodiment, $R^1$, $R^2$, $R^3$ and $R^4$ are each simultaneously or independently selected from H, fluoro-substituted-$C_{1-10}$alkyl, optionally substituted $C_{1-10}$alkyl and optionally substituted $C_{6-10}$aryl or any two of $R^1$, $R^2$, $R^3$ and $R^4$ are linked to form a optionally substituted $C_{2-6}$alkylene, which together with the nitrogen and/or boron atoms, forms a ring. In another embodiment, $R^1$, $R^2$, $R^3$ and $R^4$ are each simultaneously or independently selected from H, fluoro-substituted-$C_{1-6}$alkyl, optionally substituted $C_{1-6}$alkyl and optionally substituted phenyl, or $R^1$ and $R^2$ and/or $R^3$ and $R^4$ are linked to form a optionally substituted $C_{2-6}$alkylene, which together with the nitrogen atom and/or boron atom, forms a ring. In a further embodiment of the disclosure, $R^1$, $R^2$, $R^3$ and $R^4$ are each H. In another embodiment, $R^1$, $R^3$ and $R^4$ are H and $R^2$ is methyl.

In another embodiment, the optional substituents are independently selected from one or more of $C_{1-4}$alkyl, halo, halo-substituted $C_{1-4}$alkyl, $C_{5-8}$cycloalkyl and $C_6$aryl. In another embodiment, the optional substituents are $C_{1-3}$alkyl, halo, halo-substituted $C_{1-3}$alkyl, $C_{5-6}$cycloalkyl and phenyl.

In another embodiment, n is an integer greater than 2 and less than about 4,000,000. In a further embodiment, n is an integer greater than 2 and less than about 3,500,000. In a further embodiment, n is an integer greater than 2 and less than about 2,000,000. In a further embodiment, n is an integer greater than 2 and less than about 1,000,000. In a further embodiment, n is an integer greater than 2 and less than about 500,000. In a further embodiment, n is an integer greater than 2 and less than about 100,000.

In another embodiment of the disclosure, there is also provided a process for the production of linear, branched or cyclic polymers comprising a repeating unit of the formula (II), comprising,

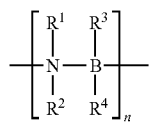

reacting a compound of the formula (I),

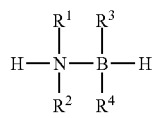

wherein $R^1$, $R^2$, $R^3$ and $R^4$ are each simultaneously or independently selected from H, fluoro-substituted-$C_{1-20}$alkyl, optionally substituted $C_{1-20}$alkyl and optionally substituted $C_{6-14}$aryl or any two of $R^1$, $R^2$, $R^3$ and $R^4$ are linked to form an optionally substituted $C_{2-10}$alkylene, which together with the nitrogen and/or boron atoms to which they are attached, forms a ring, wherein the optional substituents are independently selected from one or more of $C_{1-6}$alkyl, halo, halo-substituted $C_{1-6}$alkyl, $C_{3-10}$cycloalkyl, aryl and heteroaryl, and n is an integer ≥2, in the presence of at least one ligand-stabilized metal catalyst in an inert solvent and, optionally, in the presence of a base, wherein the metal catalyst comprises at least one ligand that bonds to the metal through a nitrogen.

In a further embodiment, $R^1$, $R^2$, $R^3$ and $R^4$ are each simultaneously or independently selected from H, fluoro-substituted-$C_{1-10}$alkyl, optionally substituted $C_{1-10}$alkyl and optionally substituted $C_{6-10}$aryl or any two of $R^1$, $R^2$, $R^3$ and $R^4$ are linked to form a optionally substituted $C_{2-6}$alkylene, which together with the nitrogen and/or boron atoms, forms a ring. In another embodiment, $R^1$, $R^2$, $R^3$ and $R^4$ are each simultaneously or independently selected from H, fluoro-substituted-$C_{1-6}$alkyl, optionally substituted $C_{1-6}$alkyl and optionally substituted phenyl, or $R^1$ and $R^2$ and/or $R^3$ and $R^4$ are linked to form a optionally substituted $C_{2-6}$alkylene, which together with the nitrogen atom and/or boron atom, forms a ring. In a further embodiment of the disclosure, $R^1$, $R^2$, $R^3$ and $R^4$ are each H. In another embodiment, $R^1$, $R^3$ and $R^4$ are H and $R^2$ is methyl.

In another embodiment, the optional substituents are independently selected from one or more of $C_{1-4}$alkyl, halo, halo-substituted $C_{1-4}$alkyl, $C_{5-8}$cycloalkyl and $C_6$aryl. In another embodiment, the optional substituents are $C_{1-3}$alkyl, halo, halo-substituted $C_{1-3}$alkyl, $C_{5-6}$cycloalkyl and phenyl.

In another embodiment, n is an integer greater than 2 and less than about 4,000,000. In a further embodiment, n is an integer greater than 2 and less than about 3,500,000. In a further embodiment, n is an integer greater than 2 and less than about 2,000,000. In a further embodiment, n is an integer greater than 2 and less than about 1,000,000. In a further embodiment, n is an integer greater than 2 and less than about 500,000. In a further embodiment, n is an integer greater than 2 and less than about 100,000.

In a further embodiment of the process, the ligand that bonds to the metal through a nitrogen is selected from one or more of an N2, PN, PNP, PNNP, NPN, NS or NNN ligand wherein N2 is a bidentate ligand of the formula $R^5R^6N-Q^1-NR^7R^8$;

PN is a bindante ligand of the formula $R^9R^{10}P-Q^2-NR^{11}R^{12}$;

PNP is a tridentate ligand of the formula $R^{13}R^{14}P-Q^3-NR^{15}-Q^4-PR^{16}R^{17}$;

PNNP is a tetradentate ligand of the formula $R^{18}R^{19}P-Q^5-NR^{20}-Q^6-NR^{21}-Q^7-PR^{22}R^{23}$;

NPN is a tridentate ligand of the formula $R^{24}R^{25}N-Q^8-PR^{26}-Q^9-NR^{27}R^{28}$;

NS is a bidentate ligand of the formula $R^{29}R^{30}N-Q^{10}-SR^{31}$; and

NNN is a tridentate ligand of the formula $R^{32}R^{33}N-Q^{11}-NR^{34}-Q^{12}-NR^{35}R^{36}$, wherein $R^5$-$R^{36}$ are independently selected from unsubstituted or substituted $C_{1-10}$alkyl, unsubstituted or substituted $C_{2-10}$alkenyl, unsubstituted or substituted $C_{3-10}$cycloalkyl, unsubstituted or substituted $C_{6-14}$aryl, or any two adjacent or geminal $R^5$-$R^{36}$ groups are bonded together to form, together with the atoms to which they are attached, a 5-14-membered monocyclic, polycyclic, heterocyclic, carbocyclic, saturated or unsaturated ring system and any of $R^5$-$R^{36}$, including rings formed therewith are achiral or chiral; and $Q^1$-$Q^{12}$ are independently selected from unsubstituted or substituted $C_1$-$C_{10}$alkylene and unsubstituted or substituted $C_1$-$C_{10}$alkenylene where adjacent or geminal substituents on $Q^1$-$Q^{12}$ are joined together to form, including the atoms to which they are attached, one or more unsubstituted or substituted 5-14-membered monocyclic, polycyclic, heterocyclic, carbocyclic, saturated, unsaturated or metallocenyl ring systems, and/or one or more of the carbon atoms in $Q^1$-$Q^{12}$ is optionally replaced with a heteromoiety selected from O, S, NH and N($C_{1-6}$alkyl) and any of $Q^1$-$Q^{12}$ is chiral or achiral.

In a further embodiment of the process the metal catalyst further comprises one or more of non-coordinating or coordinating, neutral or anionic and/or Lewis basic ligands. In another embodiment, the metal catalysts further comprise one or more ligands selected from phosphines $PR^{37}R^{38}R^{39}$, bisphospines $R^{40}R^{41}P-Q^{13}-PR^{42}R^{43}$ wherein $R^{37}$-$R^{43}$ are as defined for $R^5$-$R^{36}$ in claim 5 and $Q^{13}$ is as defined above for $Q^1$-$Q^{12}$ in claim 5, cyclooctadecane, halo, OH, H, CO, pyridine, benzene and benzene derivatives and acetonitrile. In a further embodiment, the ligand that bonds to the metal through a nitrogen is selected from one or more of:

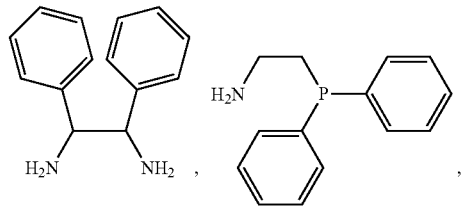

-continued

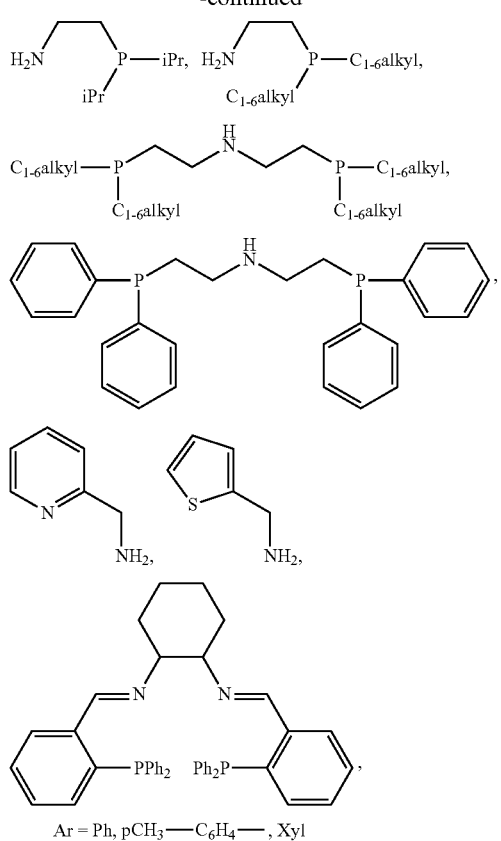

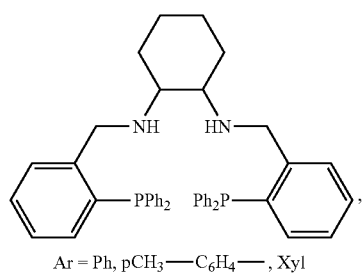

Ar = Ph, pCH₃—C₆H₄—, Xyl

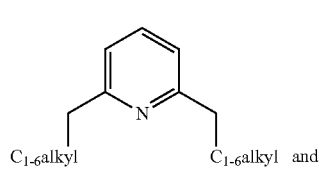

Ar = Ph, pCH₃—C₆H₄—, Xyl

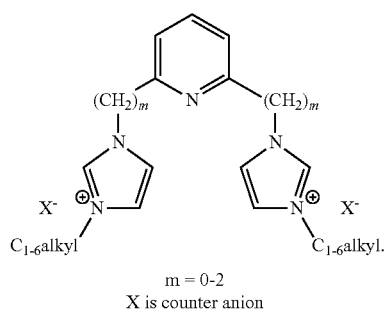

m = 0-2
X is counter anion

The following non-limiting examples are illustrative of the disclosure:

EXPERIMENTAL EXAMPLES

Materials and Methods

All ligands and their metal complexes were prepared under an argon atmosphere in an Innovative Technologies inert atmosphere glovebox or with standard Schlenk techniques, unless otherwise stated. Ammonia borane was obtained from Boroscience Ltd, or was prepared according to a literature procedure (Ramachadran, P. V.; Gagare, P. D. *Inorg. Chem.* 2007, 46, 7810-7817). Ruthenium(III) chloride hydrate (RuCl₃.3H₂O) was obtained from Pressure Chemicals Company. 1,5-Cyclooctadiene-2,4-pentanedionaterhodium(I) [Rh(COD)(acac)], and chlorobis(cyclooctene)iridium(I) dimer ([Ir(COE)₂Cl]₂) were obtained from Colonial Metals Inc. Chlorobis(1,5-cyclooctadiene)rhodium(I) dimer was obtained from Strem Chemicals. Dichloro-1,5-cyclooctadienepalladium(II) (Pd(COD)Cl₂) was prepared using standard procedures. All other metal salts were obtained from Sigma-Aldrich Ltd. and were used as received. Dichloromethane, diethyl ether, hexanes, tetrahydrofuran and toluene were dried and degassed with an Innovative Technologies solvent column containing alumina (dichloromethane), or alumina and copper oxide catalyst (diethyl ether, hexanes and tetrahydrofuran). Isopropanol was dried and degassed by distillation from calcium hydride (CaH₂) under an argon atmosphere.

Example 1

Standard Dehydrocoupling Reaction Conditions (a) Chlorohydridobis(2-(diisopropylphosphino)-4-methylphenyl)amido iridium(III) Catalyzed ammonia borane Dehydrocoupling

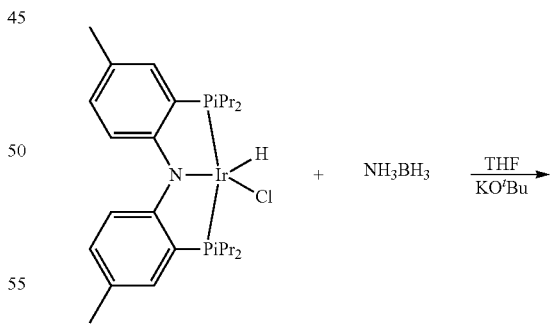

A 50.4 mg (1.632 mmol) sample of ammonia borane and 30.7 mg (0.275 mmol) of potassium tertiary butoxide was added to an L-shaped solid addition tube, which was then connected to a 100 ml three-necked flask which contained 9.8 mg (0.0156 mmol) of chlorohydridobis(2-(diisopropylphosphino)-4-methylphenyl)amidoiridium (III). The flask was placed under an argon atmosphere and then 25 ml of dried, degassed tetrahydrofuran was added. The mixture was then placed in a water bath that was heated to 40.7° C. and the temperature was allowed to equilibrate for ca. five minutes. The ammonia borane and potassium tertiary butoxide were added by inverting the reaction vessel to allow the solvent to wash the solids into the reaction mixture. The flask was then placed back into the water bath and gas evolution occurred.

All dehydrocoupling reactions were carried out under analogous conditions unless otherwise described. The structures of the various catalysts tested and their activity are summarized in Table 1.

Example 2

Hydrogen Measurement Experiments

The reactions were performed under an argon atmosphere in a 3-necked round bottom flask that was connected to a calibrated 100 ml burette (FIG. 1) and a standard vacuum manifold using the conditions described in Example 1. The ammonia borane and potassium tertiary butoxide were added via an L-shaped solid addition tube and the evolved gas was measured at one minute intervals.

(a) Chlorohydridobis(2-(diisopropylphosphino)-4-methylphenyl)amido iridium(III) Catalyzed ammonia borane Dehydrocoupling

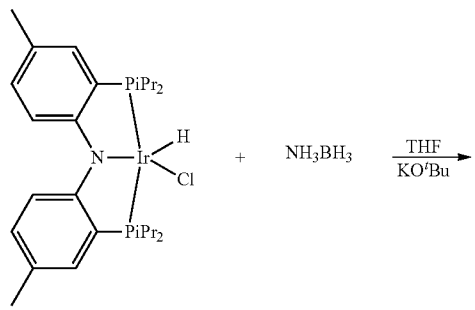

Figure 2:
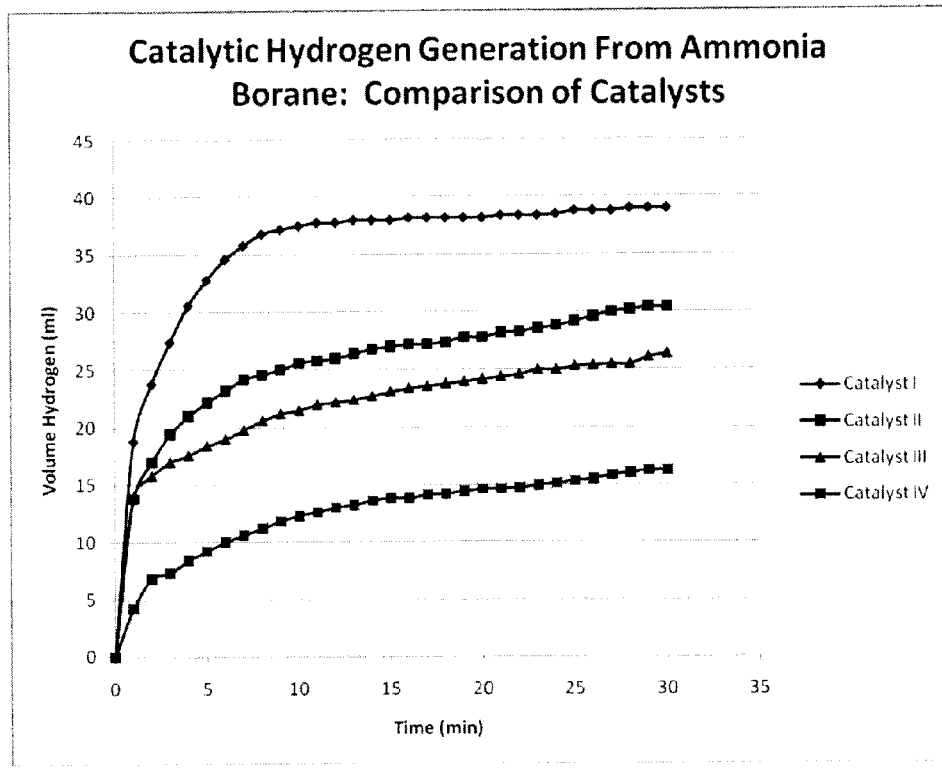
FIG. 2 is a graph showing a comparison of catalytic activities for catalysts I-IV.
Figure 2:
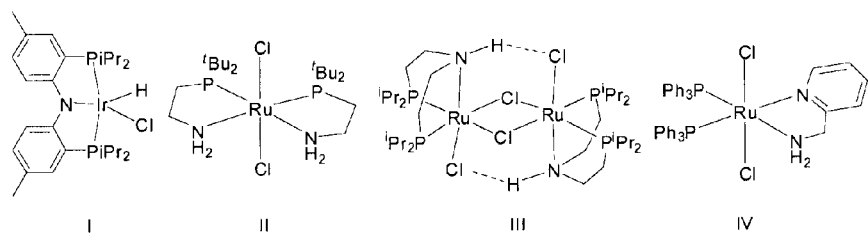

Reagent amounts were as described in Example 1(a). The results are provided in Table 2 and are shown graphically in FIG. 2 (Catalyst I).

(b) Dichloro-2-(ditertiarybutylphosphino)ethanamine ruthenium(II) Catalyzed ammonia borane Dehydrocoupling

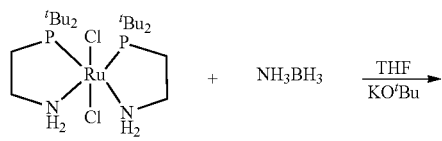

Amount of compounds: catalyst (7.8 mg, 0.014 mmol) ammonia borane (50.8 mg, 1.646 mmol); potassium tertiary-butoxide (29.8 mg, 0.266 mmol). Temperature: 40.0° C. The results are provided in Table 3 and are shown graphically in FIG. 2 (catalyst II).

(c) Bis(2-(diisopropylphosphino)ethyl)aminedichlororuthenium(II) Dimer Catalyzed ammonia borane Dehydrocoupling

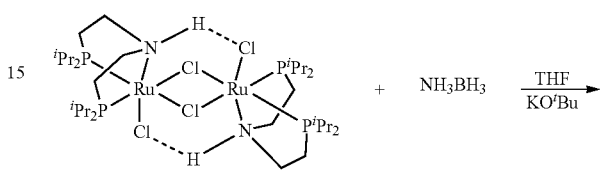

Catalyst (15.2 mg, 0.0160 mmol); ammonia borane (50.8 mg, 1.646 mmol); potassium tertiarybutoxide (29.8 mg, 0.266 mmol). Temperature: 40.0° C. The results are provided in Table 4 and are shown graphically in FIG. 2 (catalyst III).

(d) Dichloropyridin-2-ylmethanaminebis(triphenylphosphine)ruthenium(II) Catalyzed ammonia borane Dehydrocoupling

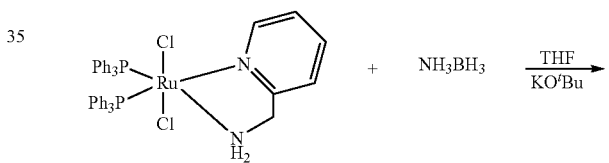

Catalyst (11.4 mg, 0.0142 mmol); ammonia borane (50.3 mg, 1.630 mmol), potassium tertiarybutoxide (29.7 mg, 0.265 mmol). Temperature: 40.8° C. The results are provided in Table 5 and are shown graphically in FIG. 2 (catalyst IV)

(e) Ammonia borane Dehydrocoupling by Catalyst Derived from $N^1N^2$-bis(2-(diphenylphosphino)benzyl)cyclohexane-1,2-diamine and cobalt(II) chloride

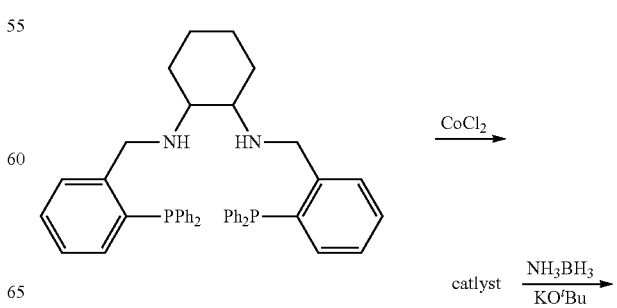

Catalyst (11.7 mg, 0.0138 mmol); ammonia borane (49.4 mg, 1.600 mmol), Potassium tertiarybutoxide (29.6 mg, 0.263 mmol). Temperature 40.1° C. The results are provided in Table 6.

(f) Dichlorobis(2-(diphenylphosphino)ethanamine)ruthenium(II) Catalyzed ammonia borane Dehydrocoupling

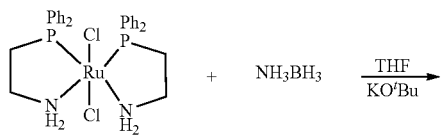

Catalyst (8.5 mg, 0.0135 mmol); ammonia borane (50.4 mg, 1.633 mmol); potassium tertiarybutoxide (27.2 mg, 0.242 mmol). Temperature 40.4° C. The results are provided in Table 7.

(g) Dichlorobis(2-(diisopropylphosphino)ethanamine)ruthenium(II) Catalyzed ammonia borane Dehydrocoupling

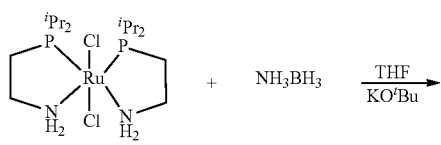

Catalyst (7.0 mg, 0.024 mmol); ammonia borane (50.4 mg, 1.633 mmol); potassium tertiarybutoxide (30.0 mg, 0.267 mmol). Temperature 40.3° C. The results are provided in Table 8.

(h) Dichlorothiophen-2-ylmethanaminetriphenylphosphineruthenium(II) Catalyzed ammonia borane Dehydrocoupling

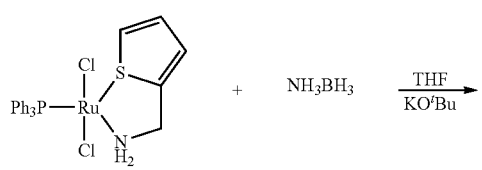

Catalyst (7.6 mg, 0.013 mmol); ammonia borane (48.3 mg, 1.565 mmol); Potassium tertiarybutoxide (33.0 mg, 0.294 mmol). Temperature 41.0° C. The results are provided in Table 9.

(i) Catalytic ammonia borane Dehydrocoupling by Catalyst Derived from 2-(diisopropylphosphino)ethanamine and cobalt(II) chloride

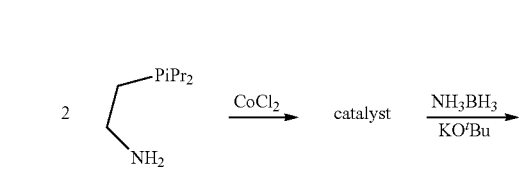

Catalyst (7.6 mg, 0.017 mmol); ammonia borane (48.3 mg, 1.565 mmol), Potassium tertiarybutoxide (33.0 mg, 0.294 mmol). Temperature 40.4° C. The results are provided in Table 10.

(j) Catalytic ammonia borane Dehydrocoupling by Catalyst Derived from thiophen-2-ylmethanamine and cobalt(II) chloride

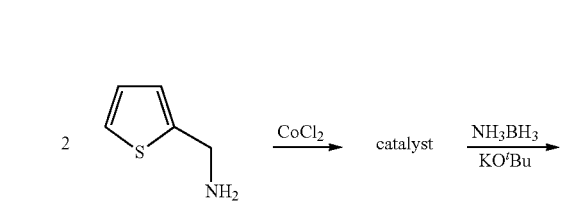

Catalyst (5.4 mg, 0.015 mmol); ammonia borane (50.0 mg, 1.620 mmol), Potassium tertiarybutoxide (30.0 mg, 0.267 mmol). Temperature 40.4° C. The results are provided in Table 11.

(k) Bis(2-(ditertiarybutylphosphino)ethyl)aminechlorocyclooct-1-enyldihydridoiridium(III) Catalyzed ammonia borane Dehydrocoupling

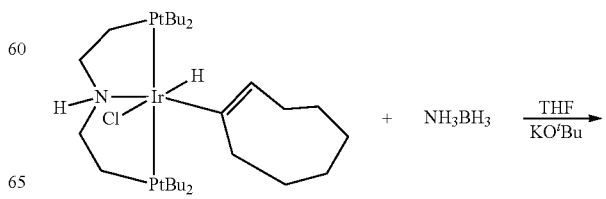

Catalyst (9.8 mg, 0.014 mmol); ammonia borane (50.7 mg, 1.642 mmol), Potassium tertiarybutoxide (30.0 mg, 0.267 mmol). Temperature 40.3° C. The results are provided in Table 12.

(l) Bis(2-(diisopropylphosphino)ethyl)aminechlorodihydridoiridium(III) Catalyzed ammonia borane Dehydrocoupling

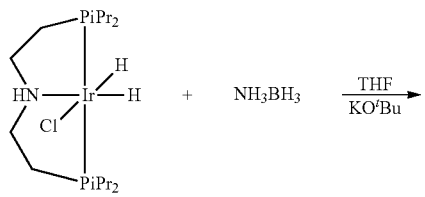

Catalyst (7.9 mg, 0.015 mmol); ammonia borane (50.4 mg, 1.633 mmol), Potassium tertiarybutoxide (30.5 mg, 0.272 mmol). Temperature 40.3° C. The results are provided in Table 13.

Example 3

Preparation of Polymer from Methylammonia Borane (i) Synthesis of methylammonia-borane (MeNH$_2$.BH$_3$)

To a 2.0 M solution of anhydrous methylamine in THF (1.0 equiv., 33.4 mL, 66.8 mmol) cooled to −78° C. was added a 1.0 M solution of BH$_3$.THF in THF (1.0 equiv., 66.8 mL, 66.8 mmol). The reaction was warmed to room temperature and stirred overnight. The reaction mixture was concentrated in vacuo, redissolved in THF, and filtered. The filtrate was then concentrated and MeNH$_2$.BH$_3$ was precipitated with hexanes to obtain a white solid. Yield: 1 g (33%). $^1$H NMR (400 MHz, CDCl$_3$):): d 3.83 (2H, br), 2.55 (3H, t, J=6.3 Hz), 1.0-2.0 (3H, q br). $^{11}$B NMR (400 MHz, CDCl$_3$): d −18.0 (q).

(ii) Preparation and Characterization of Polymer from methylammonia borane

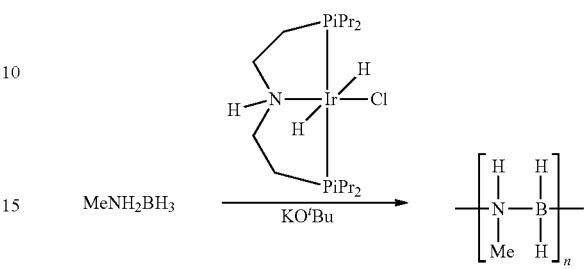

Figure 3:
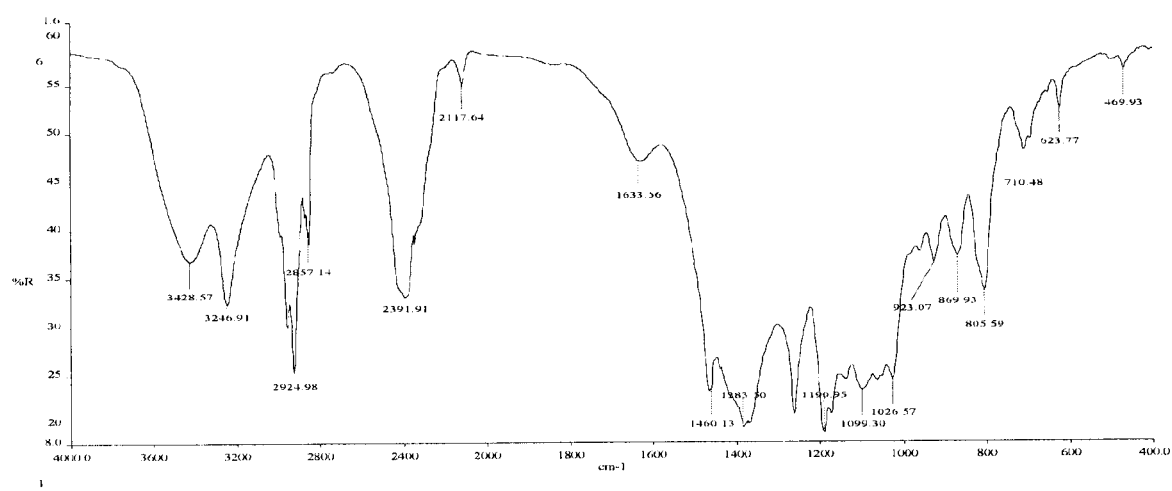
FIG. 3 is an infrared spectrum of a methylamine borane polymer.

N-Methylamine-borane (25 mg, 5 mmol) was suspended in THF (3.0 mL). Then the catalyst (above, 1.5 mg, 0.5 mol %) and KOtBu (9.38 mg, 15.0 mol %) was added as a solution in THF (1 mL). Immediate bubbling was observed. After 2 minutes at this temperature, the reaction mixture was allowed to stir for overnight. Then the mixture was precipitated into hexanes and the solid was filtered to give the polymer as a white powder, which was dried under vacuum (15 mg, 60%). $^1$H NMR (400 MHz, CDCl$_3$):): d 2.75 (1H, NH, br), 2.33 (3H, CH$_3$), 1.70 (2H, BH$_2$). $^{11}$B NMR (400 MHz, CDCl$_3$): d −8.4 (q). FT-IR (shown in FIG. 3): n 3246 (N—H), 2924 (C—H), 2391 (B—H) cm$^{-1}$.

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

TABLE 1

Summary of catalysts tested for ammonia borane dehydrocoupling

| Catalyst | Dehydrocoupling Activity |
|---|---|
| 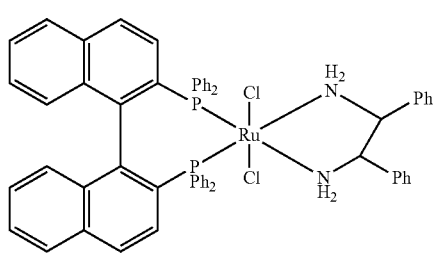 | Active |

TABLE 1-continued

Summary of catalysts tested for ammonia borane dehydrocoupling

| Catalyst | Dehydrocoupling Activity |
|---|---|
| [Ru complex with BINAP-type ligand, Cl, Cl, and NH2-CH2-CH2-PPh2] | Active |
| [Ru(PPh3)2Cl2 with pyridyl-methylamine bidentate ligand] | Active |
| [Dinuclear Ru complex with iPr2P-CH2-CH2-NH ligands and bridging Cl] | Active |
| [Ru complex with iPr2P-CH2-CH2-NH-CH2-CH2-PiPr2 pincer, Cl2, PPh3] | Active |
| [(p-cymene)Ru(R2P-CH2-CH2-NH2)Cl]+ Cl−<br>R = iPr, Ph | Active |
| [Ru(PPh3)(Cl)2 with thiophene-CH2-NH2 ligand] | Active |
| [NH(CH2CH2PR2)2·CoCl2]<br>R = iPr, Ph | Active |

TABLE 1-continued

Summary of catalysts tested for ammonia borane dehydrocoupling

| Catalyst | Dehydrocoupling Activity |
| --- | --- |
| Diaminocyclohexane bis(2-(PAr₂)benzyl) ligand + CoCl₂ → catalyst; Ar = para-C₆H₄CH₃ | Active |
| Diiminocyclohexane bis(2-(PAr₂)benzylidene) ligand + CoCl₂ → catalyst | Active |
| 2 (R₂P-CH₂CH₂-NH₂) + CoCl₂ → catalyst; R = $^i$Pr, $^t$Bu | Active, deposits black solid |
| 2 (thiophen-2-ylmethanamine) + CoCl₂ → catalyst | Active, deposits black solid |
| 2,6-bis((diisopropylphosphino)methyl)pyridine + CoCl₂ —THF→ catalyst | Active, deposits black solid |
| (P$^t$Bu₂CH₂CH₂)₂NH Ir(H)(Cl)(cyclooctene) complex | Active |
| (P$^t$Bu₂CH₂CH₂)₂N(CH₃) Ir(H)(Cl)(cyclooctene) complex | Active |

TABLE 1-continued

Summary of catalysts tested for ammonia borane dehydrocoupling

| Catalyst | Dehydrocoupling Activity |
|---|---|
| [Ir complex with P$^i$Pr$_2$, HN, Cl, H, H ligands] | Active |
| [PPh$_2$-CH$_2$CH$_2$-NH$_2$·Cl-CH$_2$CH$_2$-PPh$_2$] + 0.5 [Ir(COE)$_2$Cl]$_2$ $\xrightarrow{\text{THF, triethylamine}}$ catalyst | Active |
| [Pyridine with P$^i$Pr$_2$ arms] + [IrCl(COE)$_2$]$_2$ $\longrightarrow$ catalyst | Active |
| [Pyridine-bis(imidazolium) with $^n$Bu, 2 Cl$^-$] + 0.5 [Ir(COE)$_2$Cl]$_2$ $\xrightarrow{\text{THF, triethylamine}}$ catalyst | Moderate |
| [Pyridine-bis(methylene-imidazolium) with $^n$Bu, 2 Cl$^-$] + 0.5 [Ir(COE)$_2$Cl]$_2$ $\xrightarrow{\text{THF, triethylamine}}$ catalyst | Moderate |
| [Cyclohexane-diamine with CH$_2$-C$_6$H$_4$-PR$_2$ arms]; R = Ph, Tol, Xyl + [Ir(COE)$_2$Cl]$_2$ $\xrightarrow{\text{THF}}$ catalyst | Moderate |

TABLE 1-continued

Summary of catalysts tested for ammonia borane dehydrocoupling

| Catalyst | Dehydrocoupling Activity |
|---|---|
| [Rh complex with P$^t$Bu$_2$ amine ligand and acac] | Active |
| P$^t$Bu$_2$-amine ligand + 0.5 [RhCl(COD)]$_2$ → catalyst | Active |
| P$^t$Bu$_2$-amine ligand + ReOCl$_3$(PPh$_3$)$_2$ → catalyst | Active |
| [Ru complex with two R$_2$P-ethylamine ligands and two Cl], R = tBu, iPr, Ph | Active |

TABLE 2

Hydrogen evolution catalyzed by chlorohydridobis(2-(diisopropylphosphino)-4-methylphenyl)amidoiridium(III)

| Time (min) | Vol H$_2$ (ml) |
|---|---|
| 0 | 0 |
| 1 | 18.8 |
| 2 | 23.8 |
| 3 | 27.4 |
| 4 | 30.6 |
| 5 | 32.8 |
| 6 | 34.6 |
| 7 | 35.8 |
| 8 | 36.8 |
| 9 | 37.2 |
| 10 | 37.5 |
| 11 | 37.8 |
| 12 | 37.8 |
| 13 | 38 |
| 14 | 38 |
| 15 | 38 |
| 16 | 38.2 |
| 17 | 38.2 |
| 18 | 38.2 |
| 19 | 38.2 |
| 20 | 38.2 |
| 21 | 38.4 |
| 22 | 38.4 |
| 23 | 38.4 |
| 24 | 38.5 |
| 25 | 38.8 |
| 26 | 38.8 |
| 27 | 38.8 |
| 28 | 39 |
| 29 | 39 |
| 30 | 39 |

TABLE 3

Dichloro-2-(ditertiarybutylphosphino)ethanamineruthenium(II) catalyzed ammonia borane dehydrocoupling.

| Time (min) | Volume Hydrogen (ml) |
|---|---|
| 0 | 0 |
| 1 | 13.8 |
| 2 | 17 |
| 3 | 19.4 |
| 4 | 21 |

TABLE 3-continued

Dichloro-2-(ditertiarybutylphosphino)ethanamineruthenium(II) catalyzed ammonia borane dehydrocoupling.

| Time (min) | Volume Hydrogen (ml) |
|---|---|
| 5 | 22.2 |
| 6 | 23.2 |
| 7 | 24.2 |
| 8 | 24.6 |
| 9 | 25 |
| 10 | 25.6 |
| 11 | 25.8 |
| 12 | 26 |
| 13 | 26.4 |
| 14 | 26.8 |
| 15 | 27 |
| 16 | 27.2 |
| 17 | 27.2 |
| 18 | 27.4 |
| 19 | 27.8 |
| 20 | 27.8 |
| 21 | 28.2 |
| 22 | 28.3 |
| 23 | 28.6 |
| 24 | 28.8 |
| 25 | 29.2 |
| 26 | 29.6 |
| 27 | 30 |
| 28 | 30.2 |
| 29 | 30.4 |
| 30 | 30.4 |

TABLE 4

Bis(2-(diisopropylphosphino)ethyl)aminedichlororuthenium(II) dimer catalyzed ammonia borane dehydrocoupling

| Time (min) | Vol $H_2$ (ml) |
|---|---|
| 0 | 0 |
| 1 | 14 |
| 2 | 15.8 |
| 3 | 17 |
| 4 | 17.6 |
| 5 | 18.4 |
| 6 | 19 |
| 7 | 19.8 |
| 8 | 20.6 |
| 9 | 21.2 |
| 10 | 21.5 |
| 11 | 22 |
| 12 | 22.2 |
| 13 | 22.4 |
| 14 | 22.7 |
| 15 | 23.1 |
| 16 | 23.4 |
| 17 | 23.6 |
| 18 | 23.8 |
| 19 | 24 |
| 20 | 24.2 |
| 21 | 24.4 |
| 22 | 24.6 |
| 23 | 25 |
| 24 | 25 |
| 25 | 25.3 |
| 26 | 25.4 |
| 27 | 25.5 |
| 28 | 25.5 |
| 29 | 26.1 |
| 30 | 26.4 |

TABLE 5

Dichloropyridin-2-ylmethanaminebis(triphenylphosphine)ruthenium(II) catalyzed ammonia borane dehydrocoupling.

| Time (min) | Vol $H_2$ (ml) |
|---|---|
| 0 | 0 |
| 1 | 4 |
| 2 | 6 |
| 3 | 7.2 |
| 4 | 7.9 |
| 5 | 8.4 |
| 6 | 9 |
| 7 | 9.4 |
| 8 | 9.8 |
| 9 | 10 |
| 10 | 10.4 |
| 11 | 10.8 |
| 12 | 11.2 |
| 13 | 11.5 |
| 14 | 11.8 |
| 15 | 12 |
| 16 | 12.2 |
| 17 | 12.4 |
| 18 | 12.7 |
| 19 | 13 |
| 20 | 13.2 |
| 21 | 13.2 |
| 22 | 13.4 |
| 23 | 13.6 |
| 24 | 13.8 |
| 25 | 13.8 |
| 26 | 13.9 |
| 27 | 14.1 |
| 28 | 14.2 |
| 29 | 14.4 |
| 30 | 14.6 |

TABLE 6

Ammonia borane dehydrocoupling by catalyst derived from $N^1N^2$-bis(2-(diphenylphosphino)benzyl)cyclohexane-1,2-diamine and cobalt(II) chloride.

| Time (min) | Vol $H_2$ (ml) |
|---|---|
| 0 | 0 |
| 1 | 9.1 |
| 2 | 10.3 |
| 3 | 11.1 |
| 4 | 11.5 |
| 5 | 11.7 |
| 6 | 12 |
| 7 | 12.3 |
| 8 | 12.6 |
| 9 | 12.8 |
| 10 | 12.8 |
| 11 | 13 |
| 12 | 13 |
| 13 | 13.1 |
| 14 | 13.4 |
| 15 | 13.6 |
| 16 | 13.6 |
| 17 | 13.8 |
| 18 | 14 |
| 19 | 14.4 |
| 20 | 14.6 |

TABLE 7

Dichlorobis(2-(diphenylphosphino)ethanamine)ruthenium(II) catalyzed ammonia borane dehydrocoupling.

| Time (min) | Vol $H_2$ (ml) |
|---|---|
| 0 | 0 |
| 1 | 7.8 |
| 2 | 12 |
| 3 | 15 |
| 4 | 15.8 |
| 5 | 16.6 |
| 6 | 16.1 |
| 7 | 16.2 |
| 8 | 16.3 |
| 9 | 16.5 |
| 10 | 16.6 |
| 11 | 16.8 |
| 12 | 16.9 |
| 13 | 16.9 |
| 14 | 17 |
| 15 | 17.2 |
| 16 | 17.3 |
| 17 | 17.3 |
| 18 | 17.4 |
| 19 | 17.4 |
| 20 | 17.5 |

TABLE 8

Dichlorobis(2-(diisopropylphosphino)ethanamine)ruthenium(II) catalyzed ammonia borane dehydrocoupling.

| Time (min) | Vol $H_2$ (ml) |
|---|---|
| 0 | 0 |
| 1 | 4.2 |
| 2 | 6.8 |
| 3 | 7.3 |
| 4 | 8.4 |
| 5 | 9.2 |
| 6 | 10 |
| 7 | 10.6 |
| 8 | 11.2 |
| 9 | 11.8 |
| 10 | 12.3 |
| 11 | 12.6 |
| 12 | 13 |
| 13 | 13.2 |
| 14 | 13.6 |
| 15 | 13.8 |
| 16 | 13.8 |
| 17 | 14.1 |
| 18 | 14.2 |
| 19 | 14.4 |
| 20 | 14.6 |
| 21 | 14.6 |
| 22 | 14.7 |
| 23 | 14.9 |
| 24 | 15.1 |
| 25 | 15.3 |
| 26 | 15.5 |
| 27 | 15.8 |
| 28 | 16 |
| 29 | 16.2 |
| 30 | 16.2 |

TABLE 9

Dichlorothiophen-2-ylmethanaminetriphenylphosphineruthenium(II) catalyzed ammonia borane dehydrocoupling.

| Time (min) | Vol $H_2$ (ml) |
|---|---|
| 0 | 0 |
| 1 | 4.2 |
| 2 | 5.8 |
| 3 | 6.1 |
| 4 | 6.4 |
| 5 | 7.1 |
| 6 | 7.2 |
| 7 | 7.6 |
| 8 | 8 |
| 9 | 8.8 |
| 10 | 9.6 |
| 11 | 10.3 |
| 12 | 10.8 |
| 13 | 11.4 |
| 14 | 11.8 |
| 15 | 12 |
| 16 | 12.4 |
| 17 | 12.8 |
| 18 | 13.2 |
| 19 | 13.4 |
| 20 | 13.5 |

TABLE 10

Catalytic ammonia borane dehydrocoupling by catalyst derived from 2-(diisopropylphosphino)ethanamine and cobalt(II) chloride.

| Time (min) | Vol $H_2$ (ml) |
|---|---|
| 0 | 0 |
| 1 | 5.6 |
| 2 | 6.4 |
| 3 | 6.5 |
| 4 | 7 |
| 5 | 7.2 |
| 6 | 7.2 |
| 7 | 7.3 |
| 8 | 7.4 |
| 9 | 7.8 |
| 10 | 7.8 |

TABLE 11

Catalytic ammonia borane dehydrocoupling by catalyst derived from thiophen-2-ylmethanamine and cobalt(II) chloride.

| Time (min) | Vol $H_2$ (ml) |
|---|---|
| 0 | 0 |
| 1 | 5.0 |
| 2 | 6.2 |
| 3 | 6.2 |
| 4 | 6.8 |
| 5 | 7.0 |
| 6 | 7.2 |
| 7 | 7.4 |
| 8 | 7.4 |
| 9 | 7.6 |
| 10 | 7.8 |

TABLE 12

Bis(2-(ditertiarybutylphosphino)ethyl)aminechlorocyclooct-1-enyldihydridoiridium(III) catalyzed ammonia borane dehydrocoupling.

| Time (min) | Vol H$_2$ (ml) |
|---|---|
| 0 | 0 |
| 1 | 2.0 |
| 2 | 2.5 |
| 3 | 2.8 |
| 4 | 3.2 |
| 5 | 3.4 |
| 6 | 3.6 |
| 7 | 4.0 |
| 8 | 4.0 |
| 9 | 4.2 |
| 10 | 4.4 |

TABLE 13

Bis(2-(diisopropylphosphino)ethyl)aminechlorodihydridoiridium(III) catalyzed ammonia borane dehydrocoupling.

| Time (min) | Vol H$_2$ (ml) |
|---|---|
| 0 | 0 |
| 1 | 2.0 |
| 2 | 2.5 |
| 3 | 2.8 |
| 4 | 3.2 |
| 5 | 3.4 |
| 6 | 3.6 |
| 7 | 4.0 |
| 8 | 4.0 |
| 9 | 4.2 |
| 10 | 4.4 |

We claim:

1. A method for the production of hydrogen comprising
(a) dehydrocoupling at least one amine-borane of the formula (I)

$$R^1R^2N\text{—}BHR^3R^4 \qquad (I)$$

wherein $R^1$, $R^2$, $R^3$ and $R^4$ are each simultaneously or independently selected from H, fluoro-substituted-$C_{1-20}$alkyl, optionally substituted $C_{1-20}$alkyl and optionally substituted $C_{6-14}$aryl or any two of $R^1$, $R^2$, $R^3$ and $R^4$ are linked to form an optionally substituted $C_{2-10}$alkylene, which together with the nitrogen and/or boron atoms to which they are attached, forms a ring,
wherein the optional substituents are independently selected from one or more of $C_{1-6}$alkyl, halo, halo-substituted $C_{1-6}$alkyl, $C_{3-10}$cycloalkyl, aryl and heteroaryl,
in the presence of at least one ligand-stabilized metal catalyst in an inert solvent and, optionally, in the presence of a base, wherein the metal catalyst comprises at least one ligand that bonds to the metal through a nitrogen; and
(b) optionally collecting hydrogen produced in the dehydrocoupling of the at least one amine borane,
wherein the at least one ligand that bonds to the metal through a nitrogen is selected from one or more of an N2, PN, PNP, PNNP, NPN, NS and NNN ligand wherein
N2 is a bidentate ligand of the formula $R^5R^6N\text{-}Q^1\text{-}NR^7R^8$;
PN is a bindante ligand of the formula $R^9R^{10}P\text{-}Q^2\text{-}NR^{11}R^{12}$;
PNP is a tridentate ligand of the formula $R^{13}R^{14}P\text{-}Q^3\text{-}NR^{15}\text{-}Q^4\text{-}PR^{16}R^{17}$;
PNNP is a tetradentate ligand of the formula $R^{18}R^{19}P\text{-}Q^5\text{-}NR^{20}\text{-}Q^6\text{-}NR^{21}\text{-}Q^7\text{-}PR^{22}R^{23}$;
NPN is a tridentate ligand of the formula $R^{24}R^{25}N\text{-}Q^8\text{-}PR^{26}\text{-}Q^9\text{-}NR^{27}R^{28}$;
NS is a bidentate ligand of the formula $R^{29}R^{30}N\text{-}Q^{10}\text{-}SR^{31}$; and
NNN is a tridentate ligand of the formula $R^{32}R^{33}N\text{-}Q^{11}\text{-}NR^{34}\text{-}Q^{12}\text{-}NR^{35}R^{36}$,
wherein $R^5\text{-}R^{36}$ are independently selected from unsubstituted or substituted $C_{1-10}$alkyl, unsubstituted or substituted $C_{2-10}$alkenyl, unsubstituted or substituted $C_{3-10}$cycloalkyl, unsubstituted or substituted $C_{6-14}$aryl, or any two adjacent or geminal $R^5\text{-}R^{36}$ groups are bonded together to form, together with the atoms to which they are attached, a 5-14-membered monocyclic, polycyclic, heterocyclic, carbocyclic, saturated or unsaturated ring system and any of $R^5\text{-}R^{36}$, including rings formed therewith are achiral or chiral; and
$Q^1\text{-}Q^{12}$ are independently selected from unsubstituted or substituted $C_1\text{-}C_{10}$alkylene and unsubstituted or substituted $C_1\text{-}C_{10}$alkenylene where adjacent or geminal substituents on $Q^1\text{-}Q^{12}$ are joined together to form, including the atoms to which they are attached, one or more unsubstituted or substituted 5-14-membered monocyclic, polycyclic, heterocyclic, carbocyclic, saturated, unsaturated or metallocenyl ring systems, and/or one or more of the carbon atoms in $Q^1\text{-}Q^{12}$ is optionally replaced with a heteromoiety selected from O, S, NH and N($C_{1-6}$alkyl) and any of $Q^1\text{-}Q^{12}$ is chiral or achiral, and wherein the optional substituents are independently selected from one or more of $C_{1-6}$alkyl, halo, halo-substituted $C_{1-6}$alkyl, $C_{3-10}$cycloalkyl, aryl and heteroaryl.

2. The method according to claim 1, wherein $R^1$, $R^3$ and $R^4$ are H and $R^2$ is methyl.

3. The method according to claim 1, wherein $R^1$, $R^2$, $R^3$ and $R^4$ are each H.

4. The method according to claim 1, wherein the metal is selected from Ru, Co, Ni, Rh, Re and Ir.

5. The method according to claim 1, wherein ligand that bonds to the metal through a nitrogen is selected from one or more of:

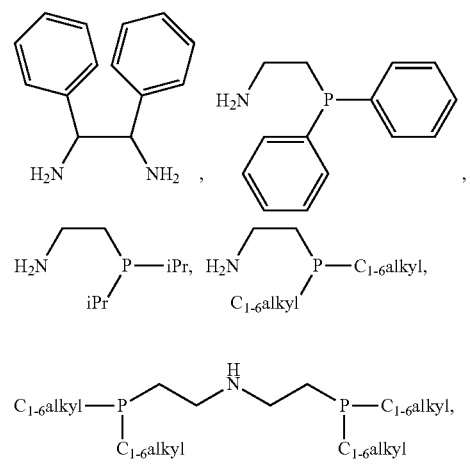

-continued

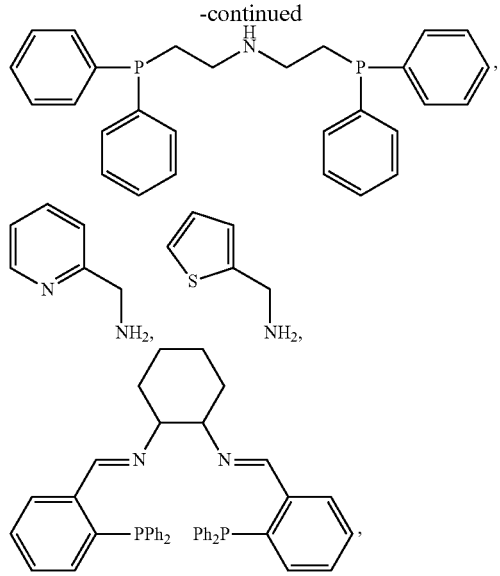

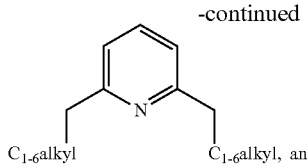

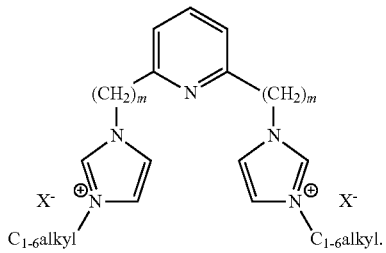

m = 0-2
X is counter anion

6. The method according to claim 1, wherein the metal catalyst further comprise one or more of non-coordinating or coordinating, neutral or anionic and/or Lewis basic ligands.

7. The method according to claim 6, wherein the metal catalysts further comprise one or more ligands selected from phosphines $PR^{37}R^{38}R^{39}$, bisphospines $R^{40}R^{41}P\text{-}Q^{13}\text{-}PR^{42}R^{43}$ wherein $R^{37}\text{-}R^{43}$ are as defined for $R^5\text{-}R^{36}$ in claim 1 and $Q^{13}$ is as defined above for $Q^1\text{-}Q^{12}$ in claim 1, cyclooctadecane, halo, OH, H, CO, pyridine, benzene and benzene derivatives and acetonitrile.

* * * * *